(12) United States Patent
Pan et al.

(10) Patent No.: US 10,054,842 B2
(45) Date of Patent: Aug. 21, 2018

(54) GIMBAL

(71) Applicant: SZ DJI OSMO TECHNOLOGY CO., LTD., Shenzhen (CN)

(72) Inventors: Paul Pan, Shenzhen (CN); Yanchong Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/390,779

(22) Filed: Dec. 27, 2016

(65) Prior Publication Data
US 2017/0108761 A1    Apr. 20, 2017

Related U.S. Application Data

(63) Continuation of application No. PCT/CN2014/081047, filed on Jun. 27, 2014.

(51) Int. Cl.
*G03B 17/56* (2006.01)
*F16M 13/04* (2006.01)
*F16M 11/02* (2006.01)

(52) U.S. Cl.
CPC ........... *G03B 17/561* (2013.01); *F16M 11/02* (2013.01); *F16M 13/04* (2013.01); *G03B 17/563* (2013.01)

(58) Field of Classification Search
CPC .... G03B 17/561; G03B 17/563; F16M 11/02; F16M 13/04
USPC ........................... 396/419–428; 348/373–376
See application file for complete search history.

(56) References Cited

U.S. PATENT DOCUMENTS

| 3,952,982 A | 4/1976 | Lewis |
| 5,708,890 A | 1/1998 | Nakano |
| 5,995,758 A * | 11/1999 | Tyler ................... G03B 17/561 |
| | | 248/325 |
| 2010/0079101 A1 | 4/2010 | Sidman |

(Continued)

FOREIGN PATENT DOCUMENTS

| CN | 201287830 Y | 8/2009 |
| CN | 201413446 Y | 2/2010 |

(Continued)

OTHER PUBLICATIONS

The World Intellectual Property Organization (WIPO) International Search Report for PCT/CN2014/081047 dated Jan. 4, 2015 p. 1-6.

*Primary Examiner* — Clayton E Laballe
*Assistant Examiner* — Dennis Hancock
(74) *Attorney, Agent, or Firm* — Anova Law Group, PLLC

(57) ABSTRACT

A gimbal includes a first support frame, a second support frame, a third support frame, and a center of gravity adjusting unit. The first support frame includes two first pillars and a guiding post connected between the two first pillars and approximately perpendicular to the two first pillars. The guiding post is configured to carry an imaging device. The second support frame includes two second pillars hinged with the two first pillars, respectively. The third support frame includes a third pillar and a connecting plate. One end of the third pillar is connected to the two second pillars. The connecting plate is connected to another end of the third pillar. The center of gravity adjusting unit is provided in one of the two first pillars, the guiding post, or the connecting plate, and configured to adjust a center of gravity of the gimbal.

19 Claims, 4 Drawing Sheets

(56) References Cited

U.S. PATENT DOCUMENTS

| | | | |
|---|---|---|---|
| 2014/0161434 A1 | 6/2014 | Koymen | |
| 2016/0201847 A1* | 7/2016 | Firchau | F16M 11/041 224/567 |
| 2017/0131622 A1* | 5/2017 | Zhao | G03B 17/561 |
| 2017/0131623 A1* | 5/2017 | Zhou | G03B 17/561 |

FOREIGN PATENT DOCUMENTS

| | | |
|---|---|---|
| CN | 101758929 A | 6/2010 |
| CN | 201604802 U | 10/2010 |
| CN | 202038441 U | 11/2011 |
| CN | 202295294 U | 7/2012 |
| CN | 102996984 A | 3/2013 |
| CN | 203258324 U | 10/2013 |
| CN | 203868620 U | 10/2014 |
| CN | 203907156 U | 10/2014 |
| EP | 0795716 A1 | 9/1997 |
| EP | 2743559 A2 | 6/2014 |
| JP | H0742894 A | 2/1995 |
| JP | 2002287216 A | 10/2002 |
| JP | 2003161998 A | 6/2003 |
| JP | 2005005887 A | 1/2005 |
| JP | 2007110449 A | 4/2007 |
| JP | 4418292 B2 | 2/2010 |
| JP | 2011118017 A | 6/2011 |

\* cited by examiner

GIMBAL

CROSS-REFERENCE TO RELATED APPLICATION

This is a continuation application of International Application No. PCT/CN2014/081047, filed on Jun. 27, 2014, the entire contents of which are incorporated herein by reference.

TECHNICAL FIELD

The present disclosure relates to image shooting devices, and particularly to a gimbal.

BACKGROUND OF THE DISCLOSURE

A gimbal may be a supporting platform for mounting a video camera, i.e., the video camera can be arranged on the gimbal. A lens of the video camera may be adjusted to properly film a target by adjusting the gimbal. A gimbal may be compatible with various types of video cameras or lenses, and the center of gravity of each axis of the gimbal may be adjusted. However, in existing mechanisms, the center of gravity may be adjusted by a relative displacement of various structural members of the gimbal. Since most of the structural members bear loads, an increased static friction between the structural members may lead to a difficult relative movement therebetween. Moreover, a small amount of relative displacement may lead to a significant change in the center of gravity, making it difficult to adjust the center of gravity.

SUMMARY

An object of the present disclosure is to provide a gimbal that may be quickly adjusted to balance the center of gravity thereof.

In accordance with the present disclosure, there is provided a gimbal for carrying an imaging device. The gimbal includes a first support frame, a second support frame, a third support frame, and a center of gravity adjusting unit. The first support frame includes two first pillars and a guiding post connected between the two first pillars and approximately perpendicular to the two first pillars. The guiding post is configured to carry the imaging device. The second support frame includes two second pillars hinged with the two first pillars, respectively. The third support frame includes a third pillar and a connecting plate. One end of the third pillar is connected to the two second pillars. The connecting plate is connected to another end of the third pillar. The center of gravity adjusting unit is provided in one of the two first pillars, the guiding post, or the connecting plate, and configured to adjust a center of gravity of the gimbal.

In some embodiments, the center of gravity adjusting unit is provided within one of the two first pillars.

In some embodiments, the center of gravity adjusting unit is provided within the guiding post.

In some embodiments, the center of gravity adjusting unit is provided within the connecting plate.

In some embodiments, the center of gravity adjusting unit is a first center of gravity adjusting unit provided within one of the two first pillars, and the gimbal further includes a second center of gravity adjusting unit provided within the guiding post.

In some embodiments, the center of gravity adjusting unit is a first center of gravity adjusting unit provided within one of the two first pillars, and the gimbal further includes a second center of gravity adjusting unit provided within the connecting plate.

In some embodiments, the center of gravity adjusting unit is a first center of gravity adjusting unit provided within the guiding post, and the gimbal further includes a second center of gravity adjusting unit provided within the connecting plate.

In some embodiments, the center of gravity adjusting unit includes a threaded rod, a weight threaded on the threaded rod, and a driving device connected with one end of the threaded rod. The weight is configured to move along a longitudinal direction of the threaded rod when the driving device drives the threaded rod to rotate.

In some embodiments, the weight includes at least one receiving groove at a sidewall of the weight, and the center of gravity adjusting unit further includes at least one anti-slip block correspondingly received in the at least one receiving groove.

In some embodiments, the threaded rod includes a threaded region having an external thread, and a first unthreaded region and a second unthreaded region having no thread and provided at two sides of the threaded region, respectively. The driving device includes a body portion and a rotating shaft mounted on the body portion and configured to rotate relative to the body portion. The center of gravity adjusting unit further includes a fastening device provided at the first unthreaded region for fixedly arranging the threaded rod within the one of the two first pillars, the guiding post, or the connecting plate. The second unthreaded region is fixedly connected to the rotating shaft.

In some embodiments, the fastening device is fixed in the one of the two first pillars, the guiding post, or the connecting plate, and includes a central positioning member and a fastening member. The central positioning member has a circular shape and includes a positioning through-hole provided in a central portion of the central positioning member. A diameter of the positioning through-hole is greater than or approximately equal to a diameter of the first unthreaded region and smaller than a diameter of the threaded region. The first unthreaded region is sleeved in the positioning through-hole and capable of rotating within the positioning through-hole. The fastening member is configured to receive the central positioning member and includes a positioning groove having a shape and a size matching the central positioning member. A diameter of the fastening member is smaller than or equal to an inner diameter of the one of the two first pillars, the guiding post, or the connecting plate in which the fastening device is fixed. The central positioning member is received in the positioning groove and fixedly connected to the fastening member.

In some embodiments, the one of the two first pillars, the guiding post, or the connecting plate is hollow and includes an inner wall having internal threads, and the body portion of the driving device is provided with external threads matching the internal threads to fixedly connect the driving device to the one of the two first pillars, the guiding post, or the connecting plate.

In some embodiments, the connecting plate includes a hollow pillar having a hollow cylindrical receiving hole. An inner wall of the receiving hole is provided with internal threads. The external thread of the driving device match the internal threads of the receiving hole to fixedly connect the driving device to the connecting plate.

In some embodiments, the gimbal further includes a handle portion and a driving portion. The driving portion includes a brushless motor having a rotor connected to the connecting plate and a stator fixed to the handle portion. The driving portion is configured to drive the third support frame to rotate.

In some embodiments, the first support frame further includes two clamping devices. The guiding post is configured to move along a longitudinal direction of the first pillars and fixed to the first pillars through the clamping devices.

In some embodiments, each of the two clamping devices includes a fastening hole, a guiding post receiving portion, and a clamp locking member. The guiding post receiving portion is arranged at a side of the fastening hole and configured to receive one end of the guiding post. An axial direction of the fastening hole is approximately perpendicular to an axial direction of the guiding post receiving portion. The clamp locking member is configured to lock the clamping device to the corresponding first pillar.

In some embodiments, the gimbal further includes a locking device including an adaptor slidably arranged on the guiding post and a mounting plate fixed to the adaptor.

In some embodiments, the adaptor includes a first pressing block and a second pressing block arranged opposite to each other and configured to be jointly locked by a screw. A circular slot is formed between the first pressing block and the second pressing block and configured to receive the guiding post. The adaptor is fixed on the guiding post when the screw is tightened and is capable of sliding on the guiding post along a longitudinal direction of the guiding post when the screw is loosened.

In some embodiments, the screw includes a lever fixed at a screw head of the screw.

In some embodiments, the guiding post is a first guiding post. The first support frame further includes a second guiding post arranged between the two first pillars and approximately parallel to the first guiding post. The first and second guiding posts are configured to carry the imaging device. The second support frame further includes a first driving device. One of the two second pillars is hinged with a rotating shaft of one of the two first pillars and another one of the two second pillars is hinged with a rotating shaft of another one of the two first pillars through the first driving device. The third support frame further includes a second driving device fixed to the one end of the third pillar and rotatably connected to the second pillars. A driving shaft of the second driving device is connected to the two second pillars to drive the two second pillars to rotate.

Compared to the conventional technologies, the gimbal of the present disclosure may further comprise at least one center of gravity adjusting unit, which is provided within at least one of the first pillars, the guiding posts, and the third support frame. A center of gravity of the gimbal may be adjusted by the center of gravity adjusting unit.

DETAILED DESCRIPTION OF THE EMBODIMENTS

The technical solution of the present disclosure will be described in detail below with reference to the embodiments of the disclosure in combination with the drawings. It should be appreciated that embodiments described herein are only part rather than all of the embodiments of the present disclosure. All other embodiments obtained by those having ordinary skills in the art based on the embodiments described herein without any inventive efforts should fall within the scope of the present disclosure.

Implementation of the present disclosure will be described in detail below, with reference to exemplary embodiments.

Figure 1:
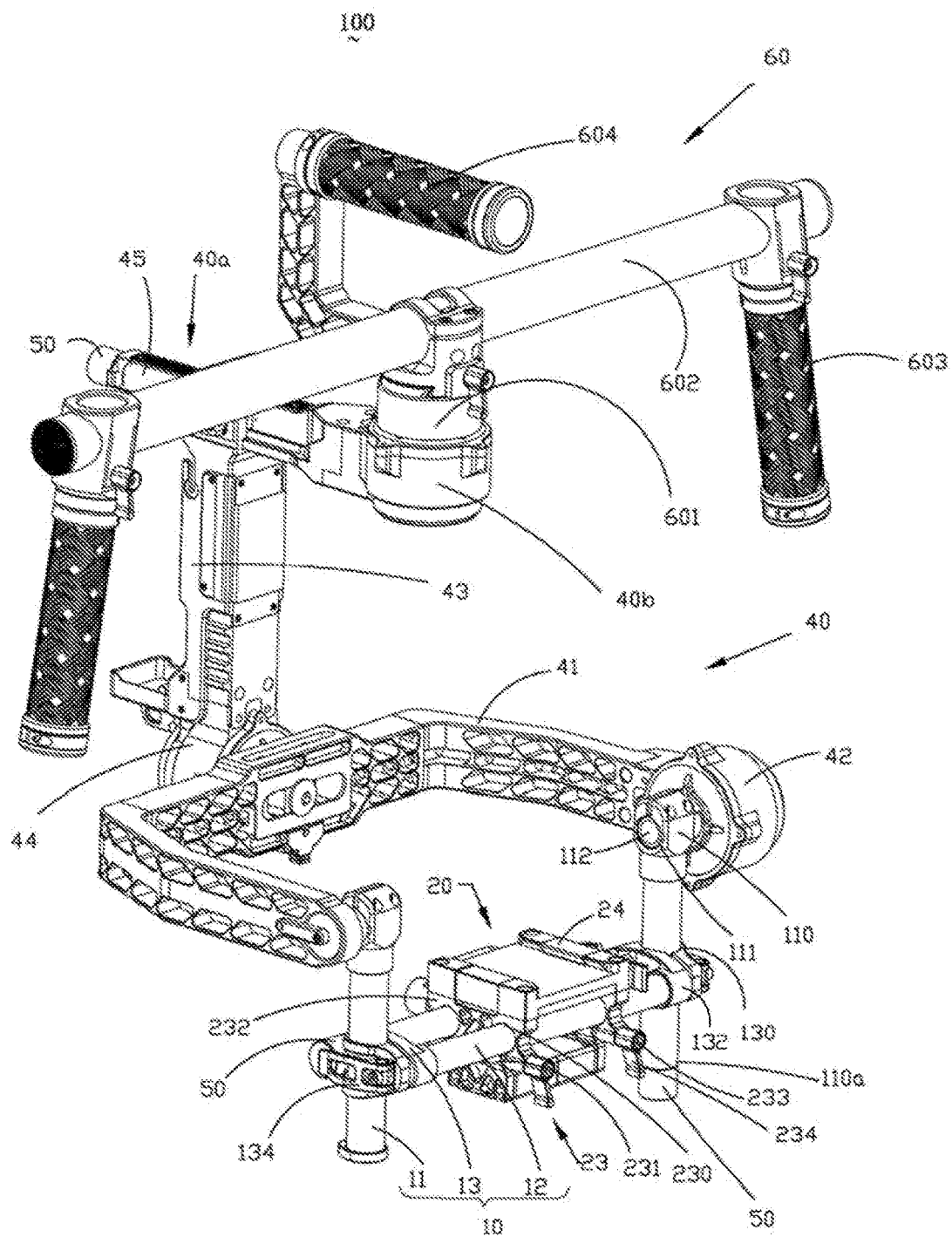
FIG. 1 is a perspective view of a gimbal according to an exemplary embodiment of the present disclosure.
Figure 2:
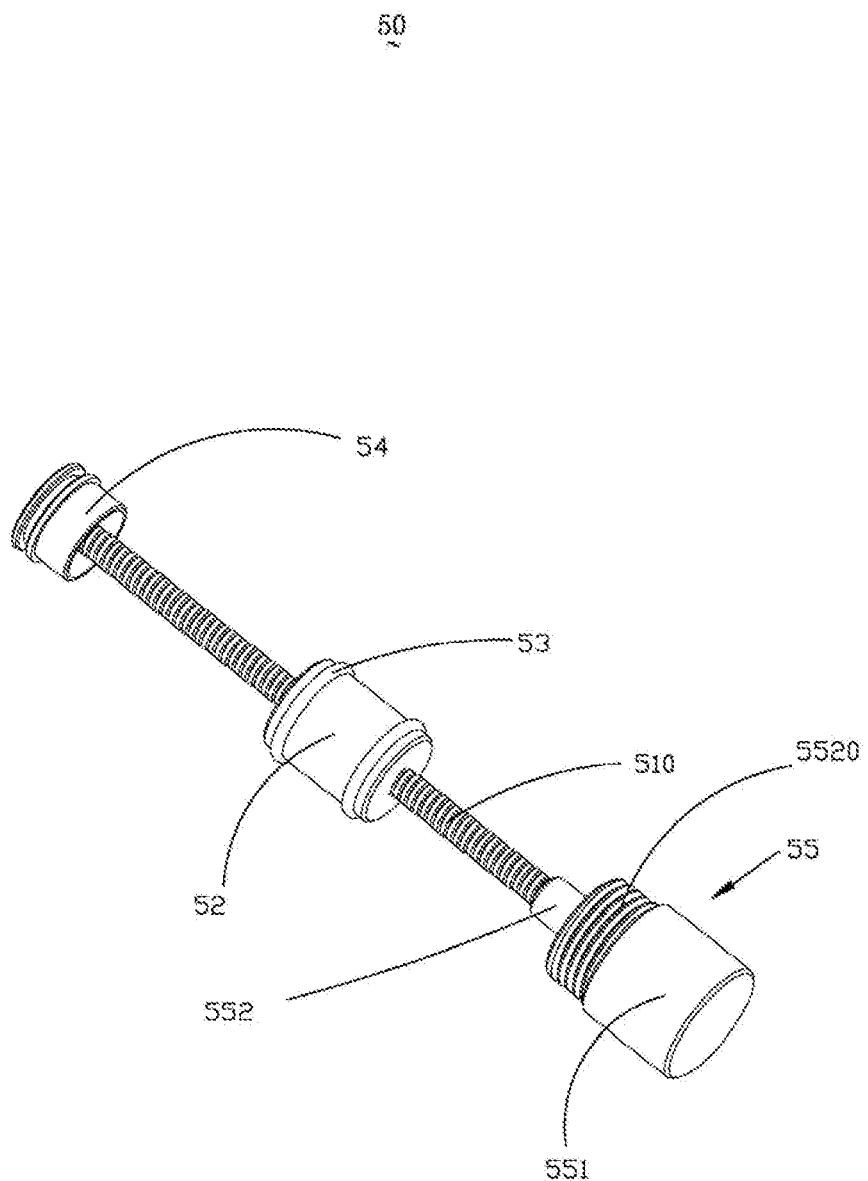
FIG. 2 is a perspective view of a center of gravity adjusting unit of the gimbal shown in FIG. 1.
Figure 3:
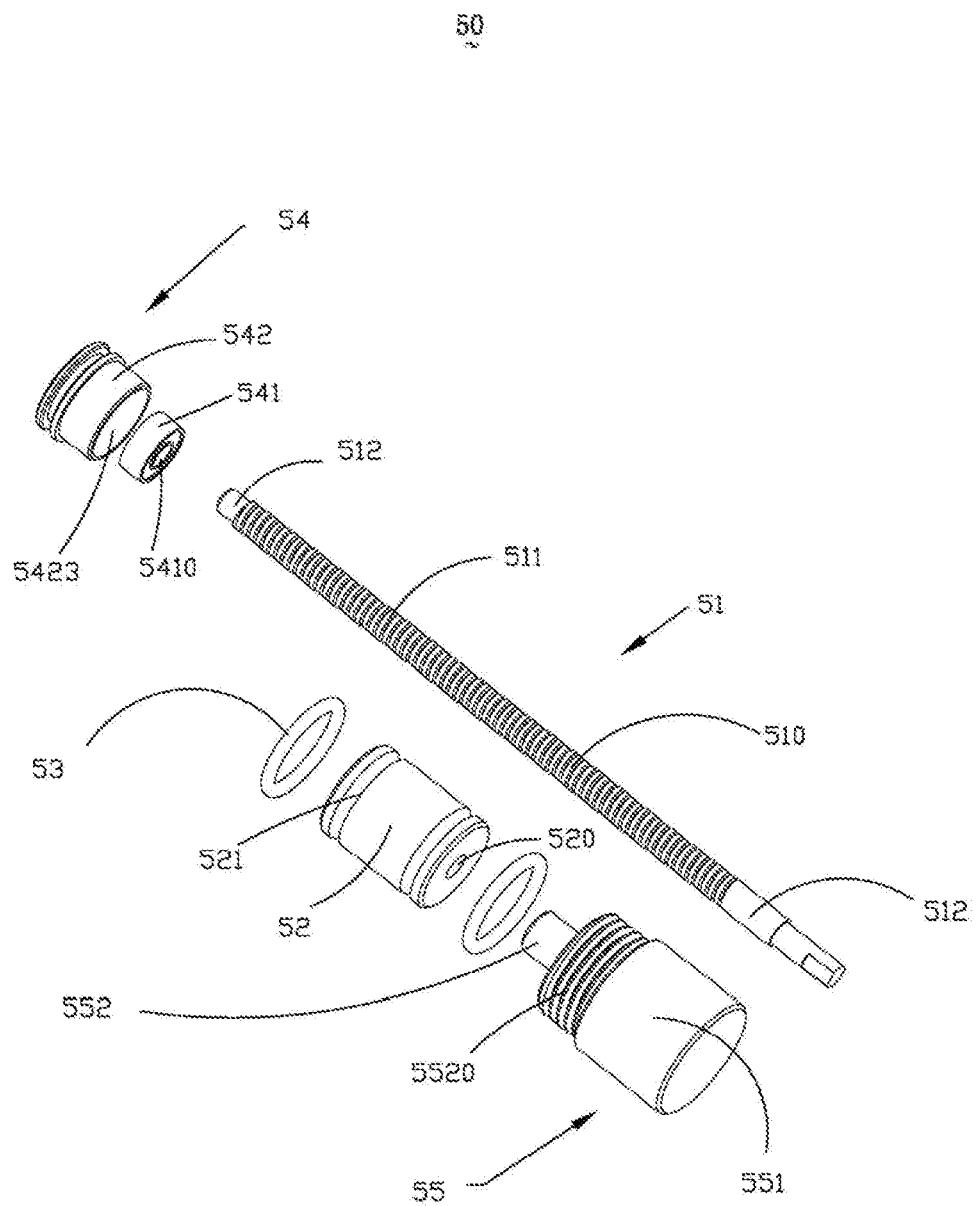
FIG. 3 is an exploded view of the center of gravity adjusting unit shown in FIG. 2.
Figure 4:
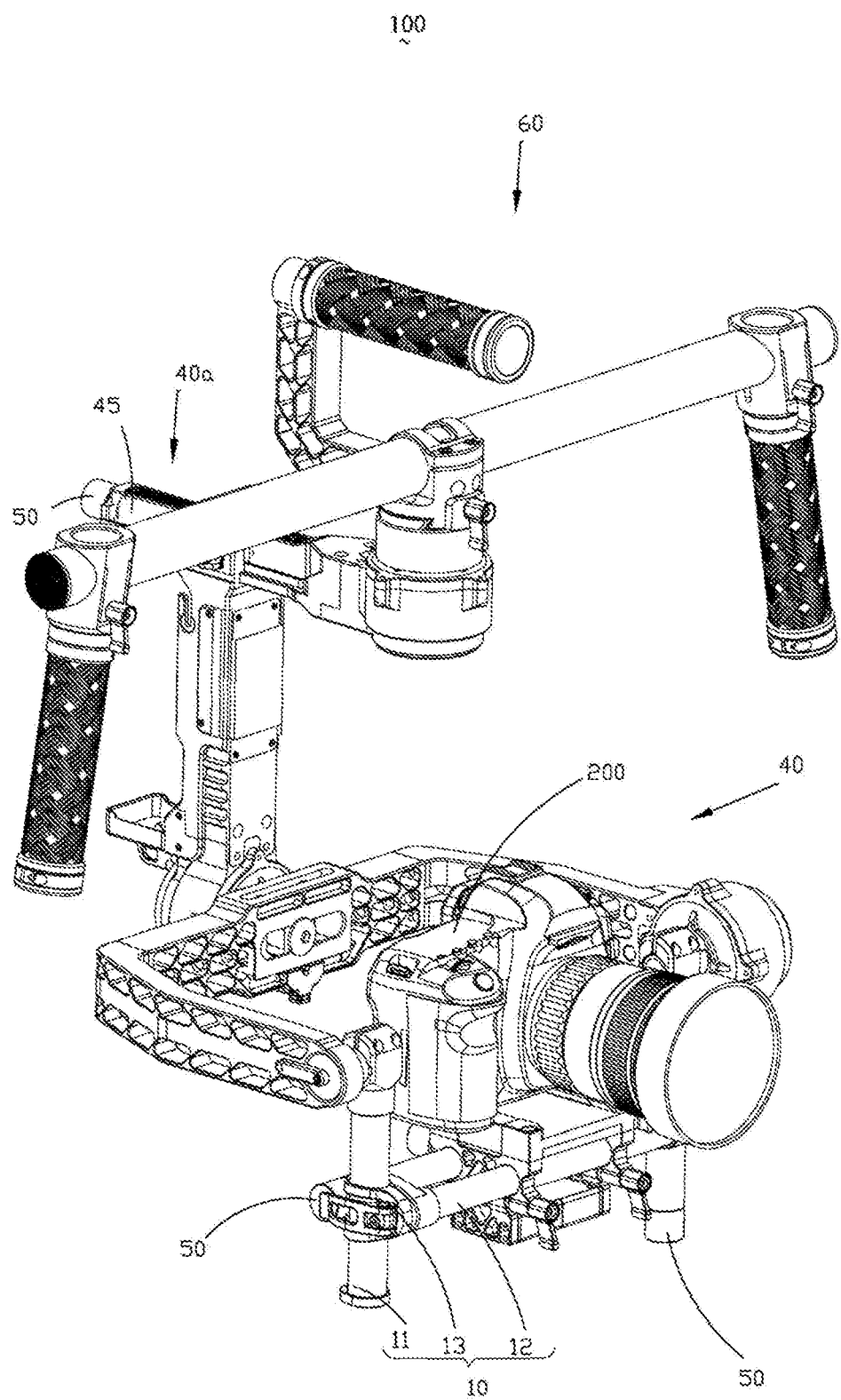
FIG. 4 is a view showing a working condition of the gimbal shown in FIG. 1.

FIGS. 1 to 3 shows a gimbal 100 for carrying an imaging device 200 (as shown in FIG. 4), consistent with embodiments of the present disclosure. The imaging device 200 may be a camera, a camcorder or a lens. In some embodiments, the imaging device 200 may be a camera.

The gimbal 100 may comprise a first support frame 10, a locking device 20 movably arranged on the first support frame 10, a second support frame 40 that may be hinged with the first support frame 10 and configured to drive the first support frame 10 to rotate, a third support frame 40a that may be hinged with the second support frame 40 and configured to drive the second support frame 40 to rotate, a driving portion 40b configured to drive the third support frame 40a to rotate, three center of gravity adjusting units 50, and a handle portion 60. In some embodiments, among the three center of gravity adjusting units 50, two center of gravity adjusting units 50 may be arranged on the first support frame 10 to adjust a center of gravity of the first support frame 10, and the third center of gravity adjusting unit 50 may be arranged on the third support frame 40a to adjust a center of gravity of the third support frame 40a.

The first support frame 10 may comprise two first pillars 11, two guiding posts 12, and two clamping devices 13. The two guiding posts 12 may be arranged perpendicular to the two first pillars 11. The two guiding posts 12 may be moved along a longitudinal direction of the first pillars 11 through the clamping devices 13, and may be fixed at any position on the first pillars 11 by the clamping devices 13.

In some embodiments, the first pillars 11 may be cylindrical. In other embodiments, the first pillars 11 may be configured in other shapes. Each of the first pillars 11 may comprise a connecting end 110 and a receiving end 110a opposite to the connecting end 110. The connecting end 110 may be provided with a through-hole 111. In some embodiments, an axial direction of the through-hole 111 may be approximately perpendicular to the longitudinal direction of the first pillar 11. A rotating shaft 112 may be provided in the through-hole 111. An inner wall of the receiving end 110a may be provided with an internal thread (not shown).

In some embodiments, the two guiding posts 12 may be cylindrical. In other embodiments, the guiding posts 12 may be configured in other shapes. An inner wall of at least one of the guiding posts 12 may be provided with an internal thread (not shown).

Each of the two clamping devices 13 may comprise a fastening hole 130, two guiding post receiving portions 132 arranged at two sides of the fastening hole 130, respectively, and a clamp locking member 134.

An axial direction of the fastening hole 130 may be approximately perpendicular to axial directions of the corresponding guiding post receiving portions 132. Shapes and sizes of the fastening holes 130 may correspond to shapes and sizes of the corresponding first pillars 11, respectively. The two first pillars 11 may be sleeved in the corresponding fastening holes 130, respectively.

Each of the guiding post receiving portions 132 may be configured to receive one end of one of the guiding posts 12, such that the two guiding posts 12 may be arranged approximately parallel to each other.

Each clamp locking member 134 may be configured to lock the corresponding clamping device 13 at an arbitrary position on the corresponding first pillar 11. In some embodiments, each clamp locking member 134 may be a lock catch made of a metallic material.

The locking device 20 may comprise an adaptor 23 slidably arranged on the guiding posts 12, and a mounting plate 24. The mounting plate 24 may be fixed on the adaptor 23. In some embodiments, the mounting plate 24 may be fixed on the adaptor 23 by bolt(s).

In order to be adjusted to slide on the guiding posts 12, the adaptor 23 may comprise a first pressing block 231 and a second pressing block 232 arranged opposite to each other. Two circular slots 230 may be formed between the first pressing block 231 and the second pressing block 232, and the guiding posts 12 may be inserted in the circular slots 230, respectively. The first pressing block 231 and the second pressing block 232 may be jointly locked by screws 233. The adaptor 23 can be fixed on the guiding posts 12 when the screws 23 are tightened and can slide on the guiding posts 12 along longitudinal directions of the guiding posts 12 when the screws 233 are loosened.

In some embodiments, a lever 234 is provided and fixed to the screw head of the corresponding screw 233. The lever 234 extends in a direction perpendicular to a longitudinal direction of the corresponding screw 233. The lever 234 may be rotated in a tightening direction of the screw 233 to tighten the screw 233. Further, the lever 234 may be rotated in a direction opposite to the tightening direction of the screw 233 to loosen the screw 233, such that the adaptor 23 may slide along the guiding posts 12. In some embodiments, the adaptor 23 may be automatically adjusted by using a lead screw mechanism.

The second support frame 40 may comprise two second pillars 41 and a first driving device 42. One of the second pillars 41 may be directly hinged with the rotating shaft 112 of one of the first pillars 11, while the other one of the second pillars 41 may be hinged with the rotating shaft 112 of the other one of the first pillars 11 through the first driving device 42. In some embodiments, the first driving device 42 may be fixed to one end of the other one of the second pillars 41 that is adjacent to the other one of the first pillars 11. A driving shaft (not shown) of the first driving device 42 may be fixedly connected to the rotating shaft 112 of the other one of the first pillars 11 to drive the rotating shaft 112 to rotate, so as to drive the first support frame 10 to rotate. In some embodiments, an axial direction of the driving shaft of the first driving device 42 may be approximately perpendicular to a longitudinal direction of the second pillar 41 to which the first driving device 42 is connected. The first driving device 42 may drive the first support frame 10 to rotate so as to adjust a filming angle of the imaging device 200. A rotating speed of the first driving device 42 may also be adjusted to adapt to various attitudes of the imaging device 200. In some embodiments, the first driving device 42 may be a brushless motor. In other embodiments, the first driving device 42 may be a brush motor or another type of motor, not limited to any particular embodiment.

The third support frame 40a may comprise a third pillar 43, a second driving device 44, and a connecting plate 45.

The third pillar 43 may be a hollow pillar. The second driving device 44 may be rotatably connected to the second pillars 41 to drive the second support frame 40 to rotate. In some embodiments, the second driving device 44 may be fixed to one end of the third pillar 43. A driving shaft (not shown) of the second driving device 44 may be fixedly connected to the second pillars 41 to drive the second pillars 41 to rotate, so as to drive the second support frame 40 to rotate. The other end of the third pillar 43 may be connected to the connecting plate 45. In some embodiments, the connecting plate 45 may have a hollow pillar structure, in which a hollow cylindrical receiving hole (not shown) may be provided. An inner wall of the receiving hole may be provided with an internal thread (not shown). The connecting plate 45 may be approximately perpendicular to the third pillar 43 and approximately parallel to the driving shaft of the second driving device 44.

In some embodiments, the driving portion 40b may be a brushless motor having a rotor connected to the connecting plate 45 and a stator fixed to the handle portion 60. The driving portion 40b may be configured to drive the third support frame 40a to rotate 360° in the horizontal direction.

The handle portion 60 may be provided as a bent rod. In some embodiments, the handle portion 60 may comprise a connecting portion 601, a supporting portion 602, and handheld portions 603. The supporting portion 602 may be a rod member, and the connecting portion 601 may be fixedly connected to a geometric center of the supporting portion 602. The connecting portion 601 may be connected to the driving portion 40b.

The handheld portions 603 may be two pillar-shaped handles fixed to two ends of the supporting portion 602.

The handle portion 60 may include a handle 604, which may be fixed to the supporting portion 602, for example, at one side of the supporting portion 602 opposite to the connecting portion 601, making it easy to carry the gimbal 100 when it is not in use. In some embodiments, the handle portion 60 may also be provided with a locking mechanism for fixing on, for example, an aerial ladder to move the gimbal 100 using machinery equipment.

In some embodiments, the three center of gravity adjusting units 50 may be arranged in one of the first pillars 11, the guiding post 12, and the connecting plate 45, respectively, to adjust centers of gravity of the first support frame 10, the second support frame 40, and the third support frame 40a, respectively.

In some embodiments, each of the center of gravity adjusting units 50 may comprise a threaded rod 51, a weight 52 threaded on the threaded rod 51, two anti-slip blocks 53, a fastening device 54, and a driving device 55.

In some embodiments, the threaded rod 51 may comprise a threaded region 511 and two unthreaded regions 512 arranged at two sides of the threaded region 511, respectively. The threaded region 511 may be provided with an external thread 510 while the unthreaded regions 512 do not have thread. A length of the threaded rod 51 may be greater than the length of the first pillar 11.

A shape of the weight 52 may match the shape of the corresponding first pillar 11, guiding post 12, or connecting plate 45, depending on where the center of gravity adjusting unit 50 is used. Hereinafter, unless otherwise specified, description is made with respect to the center of gravity adjusting unit 50, and its various components, mounted in one of the first pillars 11. It is noted, however, that the other two center of gravity adjusting units 50 mounted in the one of the guiding posts 12 and the connecting plate 45 may be similar to the center of gravity adjusting units 50 mounted in the first pillar 11, and the manners how they are mounted are also similar. Therefore, detailed description with respect to the two center of gravity adjusting units 50 mounted in the one of the guiding posts 12 and the connecting plate 45 is omitted. In some embodiments, the weight 52 mounted in the first pillar 11 may have a cylindrical shape, an outer diameter equal to an inner diameter of the first pillar 11, and a length shorter than the length of the first pillar 11.

A central portion of the weight 52 may be provided with a threaded through-hole 520 matching the external thread 510 of the threaded rod 51. A center of the threaded through-hole 520 may coincide with a center of the weight 52. Two receiving grooves 521 may be provided on a sidewall of the weight 52. In some embodiments, the weight 52 may be made of a metallic material. In other embodiments, the weight 52 may be made of another material.

In some embodiments, the anti-slip blocks 53 may be made of rubber. Each of the anti-slip blocks 53 may have a ring shape, with an outer diameter slightly greater than or equal to the inner diameter of the first pillar 11. The two anti-slip blocks 53 may be received in the two receiving grooves 521, respectively, and positioned between the first pillar 11 and the weight 52. The anti-slip blocks 53 may prevent the weight 52 from rotating together with the threaded rod 51 when the threaded rod 51 rotates.

The number of receiving grooves 521 and the number of anti-slip blocks 53 may not be limited to two, and may be selected as needed. For example, one, two, or more receiving grooves 521 and, correspondingly, one, two, or more anti-slip blocks 53 may be provided. Further, the number of weight 52 provided in the same first pillar 11 may not be limited to one, and may be set to two or more as needed, which is not limited to any particular embodiment.

The fastening device 54 may be provided on the unthreaded region 512 at one end of the threaded rod 51. The fastening device 54 is configured to fix the threaded rod 51 within the first pillar 11. In some embodiments, the fastening device 54 may comprise a central positioning member 541 and a fastening member 542 for receiving the central positioning member 541. The central positioning member 541 may be circular and may have a through-hole 5410, also referred to as a "positioning through-hole 5410," provided in a central portion of the central positioning member 541. A diameter of the through-hole 5410 may be slightly greater than or approximately equal to a diameter of the unthreaded region 512 of the threaded rod 51, and smaller than a diameter of the threaded region 511. The fastening member 542 may be provided with a positioning groove 5423 having a shape and a size matching the central positioning member 541. The central positioning member 541 may be received in the positioning groove 5423 and fixedly connected to the fastening member 542 by an adhesive. A diameter of the fastening member 542 may be slightly smaller than or approximately equal to the inner diameter of the first pillar 11. The fastening device 54 may be fixed within the first pillar 11 by an adhesive. In some embodiments, the fastening device 54 may be fixed within the first pillar 11 in another manner, for example, by a bolt.

In some embodiments, the driving device 55 may be a motor. The driving device 55 may comprise a body portion 551 and a rotating shaft 552 mounted on the body portion 551. The rotating shaft 552 may rotate relative to the body portion 551. An outer wall of the body portion 551 may be provided with an external thread 5520 matching an internal thread of the first pillar 11. The rotating shaft 552 may be have a hollow cylindrical shape. The unthreaded region 512 at the other end of the threaded rod 51 may be sleeved in the rotating shaft 552 by press fit and fixedly connected to the rotating shaft 552 by an adhesive. In some embodiments, the unthreaded region 512 of the threaded rod 51 may be sleeved in and fixed to the rotating shaft 552 by a bolt, which is not limited to any particular embodiment.

During assembly, the fastening device 54 may be first assembled and fixed within the first pillar 11. The two anti-slip blocks 53 may be placed in the two receiving grooves 521, respectively. Next, the threaded through-hole 520 of the weight 52 may be threaded onto the threaded region 511 of the threaded rod 51. The threaded rod 51 and the weight 52 threaded thereon may be assembled into the first pillar 11. The unthreaded region 512 at one end of the threaded rod 51 may be sleeved in the through-hole 5410 and capable of rotating within the through-hole 5410. Then, the unthreaded region 512 at the other end of the threaded rod 51 may be sleeved in the rotating shaft 552 and fixedly connected to the rotating shaft 552. Finally, the external thread 5520 of the body portion 551 of the driving device 55 may be threadably connected to the internal thread of the first pillar 11 so as to fixedly connect the driving device 55 to the first pillar 11.

It will be appreciated that, in practical applications, other means of connection such as bolt connection or welding may be used to fixedly connect the driving device 55 to the first pillar 11.

As noted above, the other two center of gravity adjusting units 50 may be mounted to one of the guiding posts 12 and the connecting plate 45, respectively, in a similar manner as mounting the center of gravity adjusting unit 50 to the first pillar 11. A detailed description may be omitted here for conciseness.

When the gimbal 100 is used, the imaging device 200 may be fixedly arranged on the locking device 20. In order to improve a stability of the imaging device 200 during filming, a center of gravity of the first support frame 10, the locking device 20, and the imaging device 200 as a whole may need to be on a driving shaft of the first driving device 42, such that, based on mechanical analysis, the first support frame 10 may not generate a rotational torque regardless of a rotational angle thereof, i.e., the first support frame 10 may not shake back and forth due to a torque. Therefore, a stability of the imaging device 200 may be improved during a rotation of the first support frame 10.

When the gimbal 100 operates steadily, the first support frame 10 and the imaging device 200 may also operate in a dynamically balanced state. On the other hand, in case the center of gravity of the first support frame 10, the locking device 20, and the imaging device 200 as a whole is not on the driving shaft of the first driving device 42, the center of gravity can be adjusted to fall on the driving shaft of the first driving device 42 by driving the driving device 55. In some embodiments, because the weight 52 is tightly fitted with the inner wall of the first pillar 11 through the anti-slip blocks 53, when the driving device 55 is driven, the weight 52 may move along a longitudinal direction of the threaded rod 51 rather than rotating along with the driving device 55 due to a friction between the anti-slip blocks 53 and the inner wall of the first pillar 11. As such, a fine adjustment to the center of gravity of the first support frame 10, the locking device 20, and the imaging device 200 as a whole may be performed to ensure that the center of gravity fall on the driving shaft of the first driving device 42.

In some embodiments, the first pillar 11, the guiding post 12, the connecting plate 45, and the corresponding weights 52 may each have a rectangular shape, a cubic shape, or an irregular shape. In these embodiments, each weight 52 may convert a rotation of the threaded rod 51 into a translational movement of the weight 52 within the corresponding first pillar 11, guiding post 12, or connecting plate 45.

In some embodiments, one center of gravity adjusting unit 50 may be provided in each of the two first pillars 11.

In some embodiments, one center of gravity adjusting unit 50 may be provided in each of the two guiding posts 12.

In some embodiments, at least one of the first support frame 10, the second support frame 40, and the third support member 40a may be provided with the center of gravity adjusting unit 50.

The gimbal of the present disclosure may comprise at least one center of gravity adjusting unit, which is provided in at least one of the first pillars, the guiding posts, or the third support frame. Therefore, the center of gravity of the gimbal can be adjusted by the center of gravity adjusting unit.

The foregoing description is merely illustrative of the embodiments of the disclosure but not intended to limit the scope of the disclosure. Any equivalent modifications to a structure or workflow, which are made without departing from the specification and the drawings of the disclosure, and a direct or indirect application in other relevant technical fields, shall fall into the scope of the disclosure.

What is claimed is:

1. A gimbal for carrying an imaging device, comprising:
a first support frame comprising:
two first pillars; and
a guiding post connected between the two first pillars and approximately perpendicular to the two first pillars, the guiding post being configured to carry the imaging device;
a second support frame comprising two second pillars hinged with the two first pillars, respectively;
a third support frame comprising:
a third pillar, one end of the third pillar being connected to the two second pillars; and
a connecting plate connected to another end of the third pillar; and
a center of gravity adjusting unit provided in one of the two first pillars, the guiding post, or the connecting plate, and configured to adjust a center of gravity of the gimbal, the center of gravity adjusting unit including:
a threaded rod;
a weight threaded on the threaded rod; and
a driving device connected with one end of the threaded rod,
wherein the weight is configured to move along a longitudinal direction of the threaded rod when the driving device drives the threaded rod to rotate.

2. The gimbal of claim 1, wherein the center of gravity adjusting unit is provided within one of the two first pillars.

3. The gimbal of claim 1, wherein the center of gravity adjusting unit is provided within the guiding post.

4. The gimbal of claim 1, wherein the center of gravity adjusting unit is provided within the connecting plate.

5. The gimbal of claim 1,
wherein the center of gravity adjusting unit is a first center of gravity adjusting unit provided within one of the two first pillars,
the gimbal further comprising:
a second center of gravity adjusting unit provided within the guiding post.

6. The gimbal of claim 1,
wherein the center of gravity adjusting unit is a first center of gravity adjusting unit provided within one of the two first pillars,
the gimbal further comprising:
a second center of gravity adjusting unit provided within the connecting plate.

7. The gimbal of claim 1,
wherein the center of gravity adjusting unit is a first center of gravity adjusting unit provided within the guiding post,
the gimbal further comprising:
a second center of gravity adjusting unit provided within the connecting plate.

8. The gimbal of claim 1, wherein:
the weight includes at least one receiving groove at a sidewall of the weight, and
the center of gravity adjusting unit further comprises at least one anti-slip block correspondingly received in the at least one receiving groove.

9. The gimbal of claim 8, wherein:
the threaded rod comprises:
a threaded region having an external thread; and
a first unthreaded region and a second unthreaded region having no thread and provided at two sides of the threaded region, respectively,
the driving device comprises:
a body portion; and
a rotating shaft mounted on the body portion and configured to rotate relative to the body portion,
the center of gravity adjusting unit further comprises:
a fastening device provided at the first unthreaded region for fixedly arranging the threaded rod within the one of the two first pillars, the guiding post, or the connecting plate, and
the second unthreaded region is fixedly connected to the rotating shaft.

10. The gimbal of claim 9, wherein the fastening device is fixed in the one of the two first pillars, the guiding post, or the connecting plate, and comprises:
a central positioning member having a circular shape and including a positioning through-hole provided in a central portion of the central positioning member, a diameter of the positioning through-hole being greater than or approximately equal to a diameter of the first unthreaded region and smaller than a diameter of the threaded region, and the first unthreaded region being sleeved in the positioning through-hole and capable of rotating within the positioning through-hole; and
a fastening member for receiving the central positioning member, the fastening member including a positioning groove having a shape and a size matching the central positioning member, and a diameter of the fastening member being smaller than or equal to an inner diameter of the one of the two first pillars, the guiding post, or the connecting plate in which the fastening device is fixed,
wherein the central positioning member is received in the positioning groove and fixedly connected to the fastening member.

11. The gimbal of claim 9, wherein:
the one of the two first pillars, the guiding post, or the connecting plate is hollow and includes an inner wall having internal threads, and
the body portion of the driving device is provided with external threads matching the internal threads to fixedly connect the driving device to the one of the two first pillars, the guiding post, or the connecting plate.

12. The gimbal of claim 11, wherein:
the connecting plate includes a hollow pillar having a hollow cylindrical receiving hole, an inner wall of the receiving hole being provided with internal threads, and
the external thread of the driving device match the internal threads of the receiving hole to fixedly connect the driving device to the connecting plate.

13. The gimbal of claim 1, further comprising:
a handle portion; and
a driving portion including a brushless motor having a rotor connected to the connecting plate and a stator fixed to the handle portion, the driving portion being configured to drive the third support frame to rotate.

14. The gimbal of claim 1, wherein:
the first support frame further comprises two clamping devices, and
the guiding post is configured to move along a longitudinal direction of the first pillars and fixed to the first pillars through the clamping devices.

15. The gimbal of claim 14, wherein each of the two clamping devices comprises:
a fastening hole;
a guiding post receiving portion arranged at a side of the fastening hole and configured to receive one end of the guiding post, an axial direction of the fastening hole being approximately perpendicular to an axial direction of the guiding post receiving portion; and
a clamp locking member configured to lock the clamping device to the corresponding first pillar.

16. The gimbal of claim 1, further comprising:
a locking device comprising an adaptor slidably arranged on the guiding post; and
a mounting plate fixed to the adaptor.

17. The gimbal of claim 16, wherein:
the adaptor comprises a first pressing block and a second pressing block arranged opposite to each other and configured to be jointly locked by a screw,
a circular slot is formed between the first pressing block and the second pressing block and configured to receive the guiding post, and
the adaptor is fixed on the guiding post when the screw is tightened and is capable of sliding on the guiding post along a longitudinal direction of the guiding post when the screw is loosened.

18. The gimbal of claim 17, wherein the screw comprises a lever fixed at a screw head of the screw.

19. The gimbal of claim 1, wherein:
the guiding post is a first guiding post,
the first support frame further comprises a second guiding post arranged between the two first pillars and approximately parallel to the first guiding post, the first and second guiding posts being configured to carry the imaging device,
the second support frame further comprises a first driving device, one of the two second pillars being hinged with a rotating shaft of one of the two first pillars, and another one of the two second pillars being hinged with a rotating shaft of another one of the two first pillars through the first driving device, and
the third support frame further comprises a second driving device fixed to the one end of the third pillar and rotatably connected to the two second pillars, a driving shaft of the second driving device being connected to the two second pillars to drive the two second pillars to rotate.

* * * * *